United States Patent Office 3,720,638
Patented Mar. 13, 1973

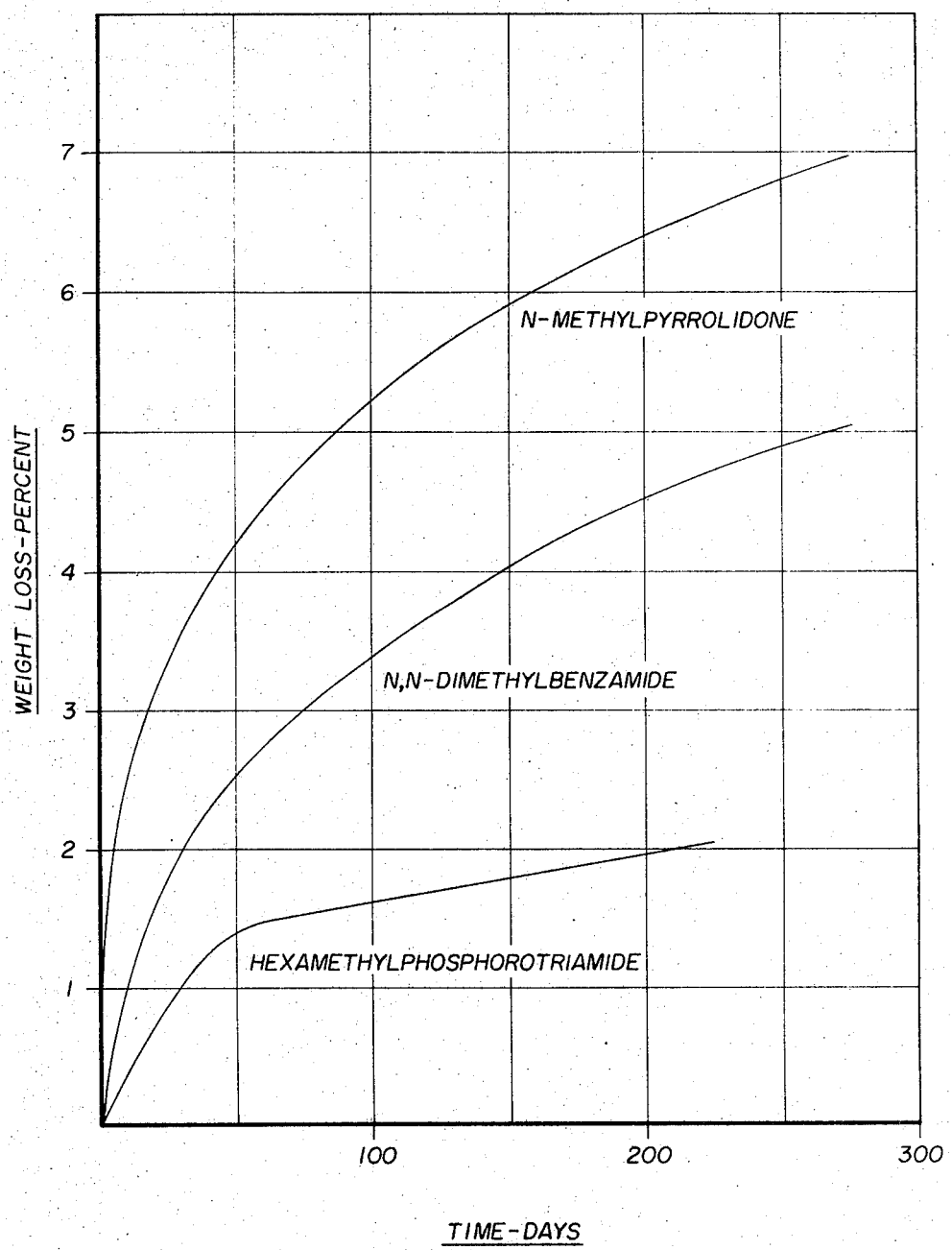

3,720,638
COMPOSITIONS OF ANIONICALLY POLYMERIZED POLYCAPROLACTAM PLASTICIZED WITH HEXAMETHYLPHOSPHOROTRIAMIDE
John M. Kolyer, Convent, and Albert A. Kveglis, Pine Brook, N.J., assignors to Allied Chemical Corporation, New York, N.Y.
Filed Feb. 24, 1969, Ser. No. 801,391
Int. Cl. C08g 51/50
U.S. Cl. 260—30.6 R     6 Claims

ABSTRACT OF THE DISCLOSURE

The impact strength of compositions of anionically polymerized polycaprolactam (nylon 6) is improved by carrying out the polymerization reaction in the presence of hexamethylphosphorotriamide.

BACKGROUND OF THE INVENTION

This invention relates to compositions of anionically polymerized polycaprolactam having improved impact strength and to the method of preparing such compositions.

It is known that caprolactam may be polymerized in the presence of a suitable anionic catalyst to prepare shaped articles of polycaprolactam in situ in a mold. A promoter is normally employed to increase the rate of polymerization.

It is further known that the impact strength of articles so prepared may be improved by adding certain compounds, commonly referred to as plasticizers, to the reaction mixture prior to polymerization. Such compounds must not only be compatible with the resulting polymer, but must also be compatible with the monomer and must not interfere with the polymerization reaction. Examples of such compounds which are known to the prior art include N,N-dimethylacetamide, N,N-dimethylbenzamide and N-methylpyrrolidone.

One drawback of known plasticizers for anionically polymerized caprolactam is that they are relatively volatile and tend to be lost, due to exudation and evaporation, from the polymer. Hence, the plasticization effected is not sufficiently permanent to be acceptable for many commercial applications. A further drawback of such plasticizers is that they tend to interfere with the preparation of laminated articles of polymerized polycaprolactam, such as produced by sequential rotational casting. If the plasticizer level is too high, the layers of sequentially cast articles fail to adhere to each other satisfactorily.

It is an object of this invention to provide compositions of anionically polymerized polycaprolactam containing a more permanent plasticizer. It is another object of this invention to provide compositions of anionically polymerized polycaprolactam having the combined properties of an acceptable degree of plasticization and an acceptable degree of permanence of said plasticization, and which may be used in the preparation of laminated articles.

SUMMARY OF THE INVENTION

We have found that compositions of anionically polymerized polycaprolactam having improved impact strength may be prepared by polymerizing, under substantially anhydrous conditions, caprolactam in the presence of an anionic polymerization catalyst, a promoter and hexamethylphosphorotriamide. Hexamethylphosphorotriamide refers to the compound having the chemical formula $[(CH_3)_2N]_3P=O$.

As a plasticizer for anionically polymerized polycaprolactam, hexamethylphosphorotriamide is not as efficient as the previously mentioned known compounds. However, the use of hexamethylphosphorotriamide has certain advantages over the sole use of such other compounds. For example, hexamethylphosphorotriamide is less volatile and hence provides more permanent plasticization. Also, hexamethylphosphorotriamide is a flame retardant and reduces the burning rate of anionically polymerized caprolactam. A further advantage of hexamethylphosphorotriamide is that it may be used in combination with other known plasticizers to tailor the plasticization effected to an acceptable degree of impact strength and to an acceptable degree of permanence. For example, it is desirable that hollow shaped articles prepared by the technique of sequential rotational casting have an impact strength which is permanent to an acceptable degree. When known plasticizers are used to achieve this degree of permanence, the plasticizer level is so high that delamination occurs in such multilayer rotational castings. This problem is solved by using hexamethylphosphorotriamide in combination with more efficient plasticizers, which provide the acceptable degree of impact strength. Hence, by using hexamethylphosphorotriamide together with other plasticizers it is possible to attain an effect which is not attainable by using only known plasticizers.

Hexamethylphosphorotriamide can be used as the sole plasticizer in those cases where the degree of plasticization which it provides is acceptable.

Plasticizers which can be used in combination with hexamethylphosphorotriamide to achieve the objects of this invention include N,N-disubstituted amides having the formula

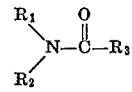

wherein $R_1$ and $R_2$ are independently selected from the group consisting of phenyl and alkyl radicals, and $R_3$ is selected from the group consisting of alkyl, phenylalkyl, phenyl, and alkylphenyl radicals, the alkyl groups having up to 5 carbon atoms. The above formula includes compounds wherein $R_3$ and $R_2$ together form a cyclic diradical, such as N-methylpyrrolidone.

Except for the addition of hexamethylphosphorotriamide to the reaction mixture, the polymerization is conducted according to methods known to the art for the anionic polymerization of caprolactam alone. The reaction is carried out under substantially anhydrous conditions and at temperatures ranging from the melting point of caprolactam to the melting point of the resulting polymer. The anionic catalyst is normally a base which is strong enough to convert caprolactam to the corresponding iminium salt. The promoter is a compound which increases the rate of polymerization. Promoters for the anionic polymerization of lactams are the subject of numerous patents and their number is so great that it would not be feasible to catalog them here, even by class. The catalyst and promoters in the examples are representative and give good results.

BRIEF DESCRIPTION OF THE DRAWING

The drawing is a graph illustrating the loss of weight with time of plasticized compositions of anionically polymerized caprolactam. The weight loss is due to evaporation of the plasticizer from the sample. Hence, the graph reflects the permanence of the plasticization imparted by the plasticizer in each sample.

DESCRIPTION OF THE PREFERRED EMBODIMENTS

The total amount of plasticizer which is added to the reaction mixture is preferably 2 to 20%, more preferably 5 to 15%, based on the caprolactam. The plasticizer can be only hexamethylphosphorotriamide or a combination of hexamethylphosphorotriamide and one or more other suitable plasticizers in any relative proportion depending on the properties sought to be achieved.

N,N-disubstituted amides selected from the group consisting of N,N-dimethylbenzamide, N,N-dimethylacetamide and N-methylpyrrolidone give particularly good results when used in combination with hexamethylphosphorotriamide.

The following examples further illustrate the invention. All parts are by weight.

Basic formulation

The reaction mixture is prepared in two portions to facilitate handling and to prevent premature initiation of polymerization.

Mixture A.—To 100 parts of ε-caprolactam is added 0.12 part lithium hydride catalyst. The mixture is maintained under a nitrogen atmosphere at about 98° C.

Mixture B.—To 100 parts of ε-caprolactam is added 0.50 part triphenoxy-s-triazine promoter. The mixture is maintained under a nitrogen atmosphere at about 160° C.

EXAMPLE 1

In Mixture B was dissolved 20 parts hexamethylphosphorotriamide. Equal volumes of Mixtures A and B were then transferred to a mold cavity heated to about 165° C. After 30 minutes the casting was removed from the hot mold. Physical properties of the composition are reported in the table.

Comparative Examples A–E

To compare the results obtained in Example 1 with unmodified polycaprolactam, the procedure of Example 1 was followed except no hexamethylphosphorotriamide was dissolved in Mixture B (Example A).

To compare the results obtained in Example 1 with compositions plasticized with known plasticizers, the procedure of Example 1 was followed except the following compounds were substituted for hexamethylphosphorotriamide:

Example—
B _____ N-methylpyrrolidone.
C _____ N,N-dimethylacetate.
D _____ N,N-dimethylbenzamide.

Physical properties of Comparative Examples A–D are reported in the table.

EXAMPLE 2

The procedure of Example 1 was followed except 18.2 parts hexamethylphosphorotriamide were dissolved in Mixture B.

A portion of the composition thus prepared was cast into a plaque having a thickness of ⅛ inch. The weight loss of the plaque with time at 63–65° C. was observed and is shown in the drawing.

Another portion of the composition was molded into test bars which were burned in accordance with ASTM D–635–63. The average burning rate of the bars was 0.401 inch per minute. The bars showed little tendency to drip and developed a heavy, black, foamy char which inhibited flame propagation. In comparison, test bars molded of the composition of Comparative Example A burned at an average rate of 0.481 inch per minute without char and dripped.

Comparative Examples E and F

To compare the weight loss of the composition of Example 2 with compositions containing other plasticizers, the procedure of Example 1 was followed except, for Example E, N-methylpyrrolidone was substituted for hexamethylphosphorotriamide and, for Example F, 26 parts N,N-dimethylbenzamide was substituted for hexamethylphosphorotriamide. Plaques having a thickness of 3/16″ were prepared from the respective compositions. The weight loss of the plaques with time at 63–64° C. is shown in the drawing.

We claim:

1. A process for preparing compositions of anionically polymerized polycaprolactam having improved impact strength which comprises polymerizing, under substantially anhydrous conditions, caprolactam in the presence of an anionic polymerization catalyst, a promoter and hexamethylphosphorotriamide, the amount of hexamethylphosphorotriamide present in the reaction mixture ranging from 2 to 20% by weight based on caprolactam.

2. The process of claim 1 wherein the reaction mixture also includes an N,N-disubstituted amide having the formula

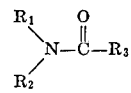

wherein $R_1$ and $R_2$ are independently selected from the group consisting of phenyl and alkyl radicals, and $R_3$ is selected from the group consisting of alkyl, phenylalkyl, phenyl, and alkylphenyl radicals, the alkyl groups having 1 to 5 carbon atoms, the total amount of hexamethylphosphorotriamide and N,N-disubstituted amide present in the reaction mixture ranging from 2 to 20% by weight based on caprolactam.

3. The process of claim 2 wherein the N,N-disubstituted amide is selected from the group consisting of N,N-dimethylbenzamide, N,N-dimethylacetamide and N-methylpyrrolidone.

4. A composition comprising anionically polymerized polycaprolactam and hexamethylphosphorotriamide wherein the amount of hexamethylphosphorotriamide ranges from 2 to 20% by weight based on the polycaprolactam.

TABLE.—PHYSICAL PROPERTIES OF COMPOSITIONS OF ANIONICALLY POLYMERIZED POLYCAPROLACTAM

| Example | A | B | C | D | 1 |
|---|---|---|---|---|---|
| Tensile properties: | | | | | |
| Ultimate tensile stress, p.s.i. | 13,578 | 8,324 | 7,930 | | 8,135 |
| Ultimate elong., percent | 24 | 260 | 195 | | 78 |
| Flexural properties: | | | | | |
| Flexural strength, p.s.i. | 15,900 | 4,680 | 4,180 | 6,310 | 7,578 |
| Flexural modulus, p.s.i. | 475,000 | 133,000 | 125,000 | 197,000 | 227,000 |
| Izod impact, ft.-lb./in. of notch | 0.5 | 7.3 | 3.8 | 1.1 | 0.8 |
| Rockwell Hardness: | | | | | |
| M | 87 | 68 | 46 | 44 | 51 |
| R | 121 | 94 | 87 | 100 | 106 |

5. The composition of claim 4 also including an N,N-disubstituted amide having the formula

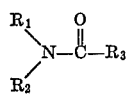

wherein $R_1$ and $R_2$ are independently selected from the group consisting of phenyl and alkyl radicals, and $R_3$ is selected from the group consisting of alkyl, phenylalkyl, phenyl, and alkylphenyl radicals, the alkyl radicals having 1 to 5 carbon atoms, the total amount of hexamethylphosphorotriamide and N,N-disubstituted amide ranging from 2 to 20% by weight based on the polycaprolactam.

6. The composition of claim 5 wherein the N,N-disubstituted amide is selected from the group consisting of N,N-dimethylacetamide and N-methylpyrrolidone.

References Cited

UNITED STATES PATENTS 3,453,244  7/1969  Preston _____ 260—78

FOREIGN PATENTS 1,462,128  11/1966  France.

MORRIS LIEBMAN, Primary Examiner

R. ZAITLEN, Assistant Examiner

U.S. Cl. X.R.

260—326 NA